United States Patent [19]
Chau et al.

[11] Patent Number: 5,187,710
[45] Date of Patent: * Feb. 16, 1993

[54] METHOD AND APPARATUS FOR THE BILLING OF VALUE-ADDED COMMUNICATIONS CALLS

[75] Inventors: Nga V. Chau, Middletown; Reuben D. Hauptman, Marlboro, both of N.J.; David D. Kaufman, Atlanta, Ga.; Barbara J. Kittredge, Jackson, N.J.; Pamela J. Lauber, Middletown, N.J.; Patricia Lindblad, Whitehouse Station, N.J.

[73] Assignee: AT&T Bell Laboratories, Murray Hill, N.J.

[*] Notice: The portion of the term of this patent subsequent to Mar. 26, 2008 has been disclaimed.

[21] Appl. No.: 629,912

[22] Filed: Dec. 19, 1990

[51] Int. Cl.$^5$ .................. H04J 3/12; H04M 15/04; H04M 15/08
[52] U.S. Cl. ............... 370/110.1; 379/114; 379/115; 379/116; 379/119; 379/120; 379/126; 379/127; 379/128; 379/130; 379/131
[58] Field of Search ............... 370/110.1; 379/114-116, 119, 120, 126-128, 130, 131

[56] References Cited
U.S. PATENT DOCUMENTS

| 4,027,104 | 5/1977 | Levitt et al. | 379/115 |
| 4,525,601 | 6/1985 | Barnich et al. | 379/119 X |
| 4,611,094 | 9/1986 | Asmuth et al. | 379/113 X |
| 4,706,242 | 11/1987 | Harland | 370/60 |
| 5,003,584 | 3/1991 | Benyacar et al. | 379/119 |

OTHER PUBLICATIONS

Patent No. vol. 14, No. 425 (E-977) (4368) Sep. 13, JP-A-2 164 180 issued in Japan on Sep. 13, 1990 to Hiroko Kuroi; Class: H0-4M15/08. Translation: abstract only.
Electrical Communication, vol. 63, No. 4, 1989, pp. 366-373, p. 369.
International Switching Symposium, Sep. 21, 1981, pp. 1-5, Van Riet, D., "BTD-a Network for Auxiliary Services," paragraph 3.
Wescon Conference Record, vol. 31, Nov. 17, 1987, San Francisco, Calif., pp. 1-5, Griffith, R., "ISDN-Gateway to features and Services."
European Search Report, #EP91 31 1238, dated Mar. 27, 1992.

Primary Examiner—Douglas W. Olms
Assistant Examiner—Russell W. Blum
Attorney, Agent, or Firm—John A. Caccuro

[57] ABSTRACT

A call billing method and apparatus establishes an ISDN connection between the network and a called location which enables the called location to specify call billing information to the network, via the ISDN connection, on a call-by-call basis. The method provides the called party real time access to network rate tables to specify call billing parameters needed to generate a separate billing record for each call made to the called location. Other features enable the caller or called location to provide various types of information for call billing purposes.

36 Claims, 4 Drawing Sheets

AMA BILLING RECORD

| INFORMATION |
|---|
| CALL TYPE |
| CONNECT DATE |
| TIMING INDICATOR |
| STUDY INDICATOR |
| ANSWER INDICATOR |
| SERVICE OBSERVED, TRAFFIC SAMPLED |
| 401 — OPERATOR ACTION |
| SERVICE FEATURE |
| 402 — ORIGINATING NPA |
| 403 — ORIGINATING NUMBER |
| 404 — DIALED NPA (900) |
| 405 — DIALED NUMBER |
| DESTINATION OVERSEAS INDICATOR |
| 406 — DESTINATION NPA |
| 407 — DESTINATION NUMBER |
| 408 — CONNECT TIME |
| 409 — ELAPSED TIME |
| OPERATOR CHARGE INDICATOR |
| BILL TO INDICATOR |
| 421 { SERVICE INDICATOR CODE |
| SERVICE FEATURE INDICATOR |
| CUSTOMER RAO NUMBER |
| 410 — CUSTOMER FEATURE AVAILABLE |
| ANNOUNCEMENT BEFORE ROUTING |
| CALL PROGRESS STOPPED |
| 420 { IPL-INITIAL PERIOD LENGTH |
| APL-ADDITIONAL PERIOD LENGTH |
| FPL-FREE PERIOD LENGTH |
| IPR-INITIAL PERIOD RATE |
| APR-ADDITIONAL PERIOD RATE |
| SAI-SUBACCOUNT INDICATOR |
| RM-RATE MODIFIERS |

METHOD AND APPARATUS FOR THE BILLING OF VALUE-ADDED COMMUNICATIONS CALLS

TECHNICAL FIELD

This invention relates to a telecommunication billing method and apparatus for specifying and calculating the billing charges associated with value-added communication calls.

BACKGROUND OF THE INVENTION

The new value-added services (e.g., 700 number, 800 number and 900 number services) are designed for mass calling to a service provider (sponsor) number with the calling party generally paying for the call. These 900 number services (e.g., DIAL-IT ® 900-service offered by American Telephone and Telegraph Co.-AT&T) allow sponsors to offer a variety of value-added telecommunication services (Dial-A-Prayer, Televoting, etc.), to their clientele for which additional charges are assessed. To access the service, the clientele (callers) dial, illustratively, a 900-NXX-XXXX number and are routed to a Carrier Switch Network (CSN) Mass Announcement System (MAS) where the callers listen to the sponsor's prerecorded announcement. At present, the sponsors select the rate callers will pay for the service when the 900 number is assigned by the CSN. The 900 number and the rate selected by a sponsor are stored in a table in a CSN billing system. When a call is made to a sponsor's 900 number, the central office switch in the Local Exchange Company (LEC) makes a call record including the calling and called party of each call. These call records are transported periodically (typically every month) from the LEC to the CSN, and rated using the appropriate sponsor's rate table. This rating process involves a table look-up process to determine each caller's charge for a call to a particular sponsor's number. The resulting caller charge records are then returned to the LEC which includes the charges as part of the callers' monthly bill.

New CSN services now provide the sponsor more flexibility in defining their services by routing the value-added calls to a sponsor-selected location. One such service is the MultiQuest ® telecommunications service offered by AT&T. These new services enable a sponsor to provide a greater variety of value-added services which may now include interactive dialog between the caller and the sponsor's agent. There is a continuing need for the CSN to add more flexible billing for these sponsor-provided value-added services.

SUMMARY OF THE INVENTION

In accordance with the billing method and apparatus of the present invention, a caller is billed for charges incurred during a call made over a communication network to a sponsor location (equivalently referred to herein as called party) by 1) establishing an Integrated Services Digital Network (ISDN) call connection between the network and the called party location, 2) the network transmitting to the called location, over that same connection, the caller's identification number, and 3) the network receiving from the called location, over that same connection, billing information specifying charges incurred by the caller during the call.

This arrangement provides the sponsor with more flexibility in billing callers for a sponsor's value-added services. Billing flexibility is achieved in accordance with the invention by creating a separate billing record for each call using sponsor-provided call billing parameters which can be updated during the call by the sponsor. Desirably, determining sponsor charges and creating a billing record on a call-by-call basis eliminates the need for the table look-up procedure required by the prior art call billing methods.

Another billing arrangement known to applicants which also solves the previously-described problems is described in the allowed patent application of I. Benyacar, et al., Ser. No. 509,662 filed on Apr. 16, 1990, and entitled "Method and Apparatus for the Billing of Value-Added Communication Calls." The Benyacar application, however, solves these problems by enabling the called-party location to access the network's operations support system (DSD-NCP 180 of FIG. 1) substantially in real time to specify call rating data and other associated call rate modifiers. In Benyacar, call rating information is sent to the network's operations support system via a separate connection which connection is different from the caller-to-called-party location connection, whereas, according to the present invention, call billing information is sent to the network's billing recording toll switch (e.g., the terminating toll switch) (TTS/SN 160 of FIG. 1) using the same caller-to-called-party location connection.

In accordance with various features of the present invention, caller charges may be specified as call billing parameters which may be changed in real time during the call and which may vary depending on the call type, time-of-day, geographic region, etc. These called party or sponsor-specified caller charges are then incorporated into the standard Automated Message Accounting (AMA) record generated by the CSN for each call and sent to a network billing system which processes the sponsor-specified caller charges for inclusion in the network bill sent to the customer.

GENERAL DESCRIPTION

Figure 1:
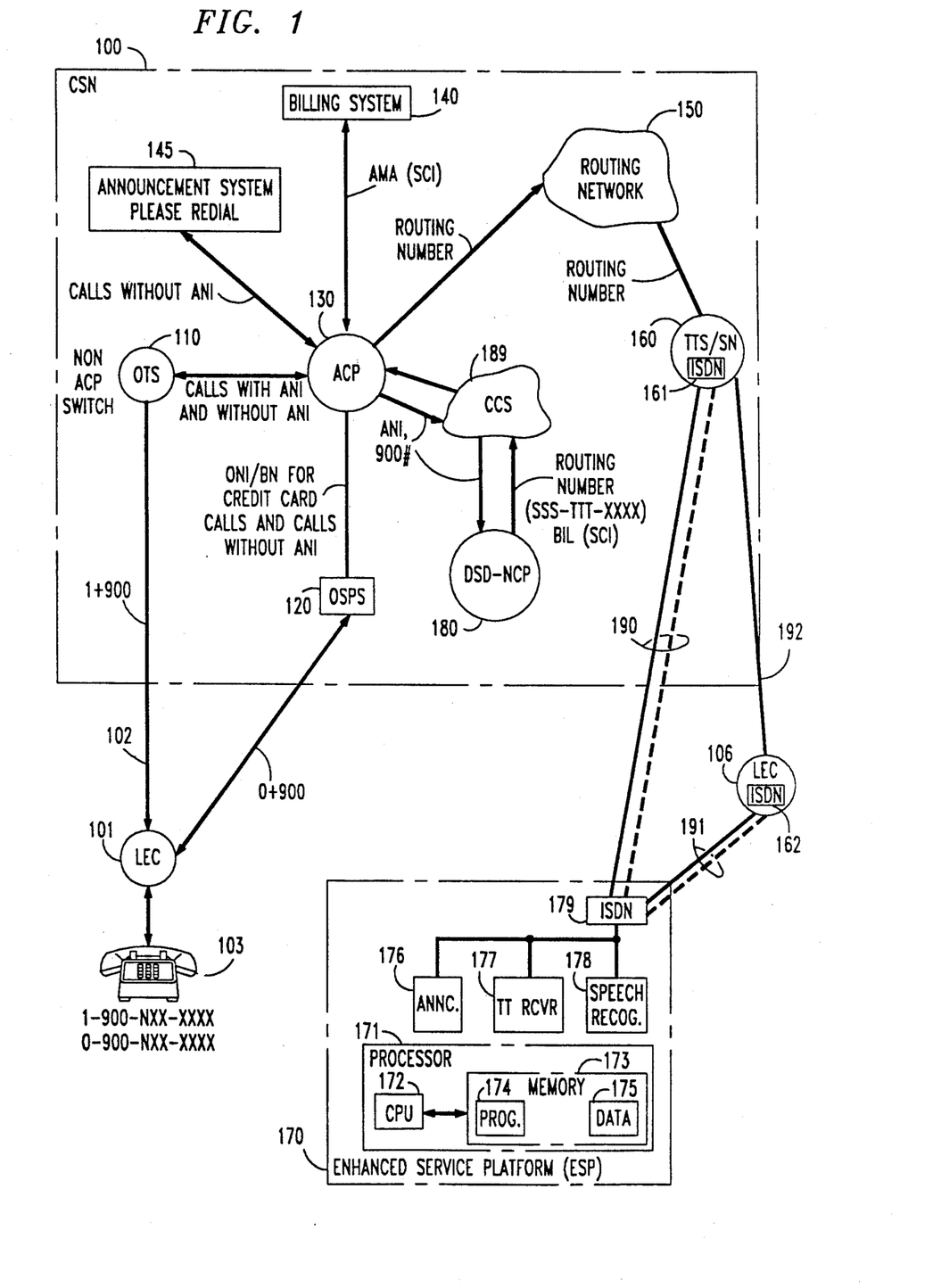
FIG. 1 shows, in block diagram form, an illustrative carrier switch network (CSN) useful in describing the operation of the present invention.

Before proceeding with the operating description of the inventive method and apparatus for billing value-added communication calls, it should be recognized that the apparatus and method of the invention may be adapted for use with a variety of different systems which can be arranged to implement the switching network configuration shown in FIG. 1. Since the various systems shown in FIG. 1 utilize a variety of hardware and programming techniques, no attempt is made to describe the existing programs used to control these various systems. However, using the following description as a guide, the operations of the present invention should be integrated into the control structure of the various systems of FIG. 1, and tailored to cooperate with other features and operations of those systems. Thus, in order to avoid confusion and enable those skilled in the art to practice the claimed invention, this specification will describe the operation of the present invention using the network block diagram of FIG. 1, the call flow diagrams of FIGS. 2 and 3 and the billing record shown in FIG. 4. In the following description, the first digit of an element's reference number designates the figure where the element is located (e.g., 101 is located in FIG. 1).

With reference to FIG. 1, there is illustrated a block diagram of a well-known switching network configuration useful in describing the operation of the present invention. The drawing illustrates a Local Exchange Carrier (LEC) 101 and a Carrier Switch Network (CSN) 100. The LEC 101 serves telephone station 103, and enables this station to complete calls to other stations (not shown) of the network in a well-known manner. The CSN 100 also enables station 103 to access value-added services provided by vendors (sponsors) via equipment such as enhanced services platform (ESP) 170 connected to CSN 100. The ESP 170, using ISDN interface 179, may connect to CSN 100 directly via ISDN facility 190 or indirectly via ISDN facility 191, LEC 106 and facility 192.

The CSN 100, illustratively, may comprise Originating Toll Switch (OTS) 110, Operator Services Position System (OSPS) 120, Action Point (ACP) 130, billing system 140; routing network 150, Terminating Toll Switch (TTS)/Service Node (SN) 160, Network Control Point (NCP) 180 and Announcement System 145.

While LEC 101 is shown, illustratively, to connect via facility 102 to OTS 110 in FIG. 1, it may equivalently also connect directly to ACP 130. Thus, OTS 110, and ACP 130 are points in CSN 100 which usually interface to other networks (e.g., LEC) or may directly connect to telephone stations (e.g., 103). Since OTS 110, in our example, does not contain the ACP software, it is considered a non-ACP switch. Consequently, all calls originated through OTS 110 must be directed to a toll switching office having ACP 130 software (e.g., 130), hereinafter designated as an ACP 130. The ACP 130 is characterized as having a Common Channel Signaling (CCS) network connection to centralized data bases referred to as a Network Control Point (NCP). Some NCPs, e.g., 180, have Direct Services Dialing (DSD) capability which permits direct access by ACP 130 offices using dialing codes. The DSD-NCP 180 is hereinafter referred to as NCP 180. The structure and general operation of ACPs and NCPs is described in R. L. Asmuth, U.S. Pat. No. 4,611,094 which is incorporated herein by reference.

The operation of Network Control Point (NCP) 180 is also described, for example, in the D. Sheinbein, et al., article on pp. 1737-1744 *Bell System Technical Journal*, (BSTJ), September, 1982, Volume 61, No. 7, part 3. The changes in the operation of NCP 180 to perform the functions of the present invention are described in later paragraphs.

The CCS 189 direct signaling facilities which link ACP 130 and NCP 180 are, basically, a packet switching system for routing messages in accordance with their address data contents. CCS 189 network features are disclosed in the February, 1978, *Bell System Technical Journal*, (BSTJ) No. 2 and in W. B. Smith, et al., U.S. Pat. No. 3,624,613 of Nov. 30, 1971.

An illustrative OSPS 110 is described in the article written by N. X. DeLessio, et al.: "An Integrated Operator Services Capability for the 5ESS Switching System", *International Switching Symposium*, (Florence), Session 22C, Paper 3, pp. 1-5, May, 1984.

It should be noted that the structural details of LEC 101, toll office OTS 110 and the OSPS 120 form no part of the present invention and are only described herein to the extent necessary for an understanding of the invention.

LEC 101 may be, illustratively, a 5ESS ® (electronic switching system). The 5ESS is extensively described by K. E. Martersteck, et al., in *AT&T Technical Journal*, Volume 64, No. 6, part 2, pp. 1305-1564, July/August, 1985. The above-identified disclosures and the citations referred to therein may be consulted for a complete understanding of the construction and operations of a typical toll office.

The OTS 110, ACP 130 and TTS/SN 160 may be, illustratively, an electronic program-controlled telephone system of the No. 4ESS design as described by A. E. Ritchie, et al., in the *Bell System Technical Journal*, (BSTJ), September, 1977, Volume 56, No. 7.

The TTS/SN 160 and LEC 106 each include an ISDN interface 161 and 162, respectively, which enables ISDN signaling between the No. 4ESS system and the sponsor's enhanced service platform (ESP) 170 via ISDN facilities 190 and 191, respectively.

Sponsor ESP 170 also includes an ISDN interface 179 to ISDN facility 190 or 191. The ISDN Facilities 190 and 191 may provide either Primary Rate interface (PRI) ISDN service or Basic Rate Interface (BRI) ISDN service. The well-known ISDN technology is described in the *AT&T Technical Journal*, Vol. 66 Iss. 3, May-June, 1987, and, Vol. 65, Iss. 1, January-February, 1986, which is incorporated by reference herein. In addition, it is assumed that all ISDN equipment utilize the well-known ISDN Q.931 protocol, and support ISDN applications as defined in AT&T Network's ISDN Primary Rate Interface Specification, *Technical Reference* 41449, April 1989, and AT&T Network's ISDN Primary Rate Interface and Special Applications Specification, *Technical Reference* 41459, April 1989.

As is known in the art, each PRI ISDN trunk consists of 23 lines, or "B" channels, that are available for use in sending and receiving information. In addition, each trunk also consists of a "D" channel which is used for sending signalling and control data in order to manage the information carried by the 23 B channels. Each BRI ISDN trunk is comprised of 2 B channels and a D channel. The present description assumes that the ISDN interfaces 161, 162 and interface 179, and ISDN facilities 190 and 191, as utilized and described herein operate in the standard well-known manner.

In accordance with the present invention, one or more B channel(s) are used for communication between the caller 103 and the called location ESP 170, while the D channel is used for communicating signaling and control messages including caller identification and billing information between network 100 and ESP 170.

The sponsor-enhanced service platform 170 may provide any of a variety of well-known services such as information database service, consulting service, marketing service, etc. The ESP 170 may typically include a processor 171 comprising CPU 172 and memory 173 including program memory 174 and data memory 175. The ESP 170 may, illustratively, be part of or an adjunct to a Private Branch Exchange (PBX), not shown, at the sponsor location. Program memory stores the program required to manage the various services provided by ESP 170 including the interactions with the caller. The data memory 175, illustratively shown as part of processor 171, contains an operational billing database as well as the information databases required to provide the various services provided by ESP 170. Alternatively, data memory 175 may be part of a data base system (not shown) which is accessible by processor 171. Announcement circuit 176 provides the various announcements used by ESP 170 to output the menu to the caller and to interact with the caller. The touch-tone receiver 177 enables the detection of user touch tone inputs in response to voice announcement inquiries outputted to the user by ESP 170. The speech recognizer 178 enables ESP 170 to determine a caller voice response to system inquiries.

DETAILED DESCRIPTION

In accordance with the method and apparatus of the present invention, when a customer (e.g., caller at station 103) dials a value-added call to a sponsor number, the call is routed to a sponsor location (e.g., ESP 170) and any sponsor-specified charges incurred during the call are separately determined for each call and included in the network bill to the caller. It should be understood that the term "sponsor" as used herein includes any person acting on behalf of the sponsor. The sponsor-specified charges are incurred for value-added services provided by the sponsor during the call. The sponsor-specified charges are determined using sponsor-provided call billing parameters which may change substantially in real time by the sponsor. Note, while a value-added call is described herein as using a 900 access code, it should be understood that other service access codes could be used to signify a value-added call. While the present invention has been described for value-added service calls using 900 numbers, it should be understood that it may also be used with other telecommunication services, for example 976-XXXX number calls or 700 or 800-number calls.

The present invention enables the sponsor (at ESP 170) to interactively specify call billing parameters which specify the caller charges. These sponsor-specified caller charges are transported on a call-by-ball basis from ESP 170 via ISDN facility 190 or 191 (and TSS/SN 160, routing network 150 and ACP 130) to the billing system 140. Note, the billing system 140 could, alternatively, be connected to the originating toll switch 110 or the terminating toll switch 160. The billing system 140 recognizes and processes the sponsor-specified charges for inclusion in the network bill to the customer (caller).

Figure 2:
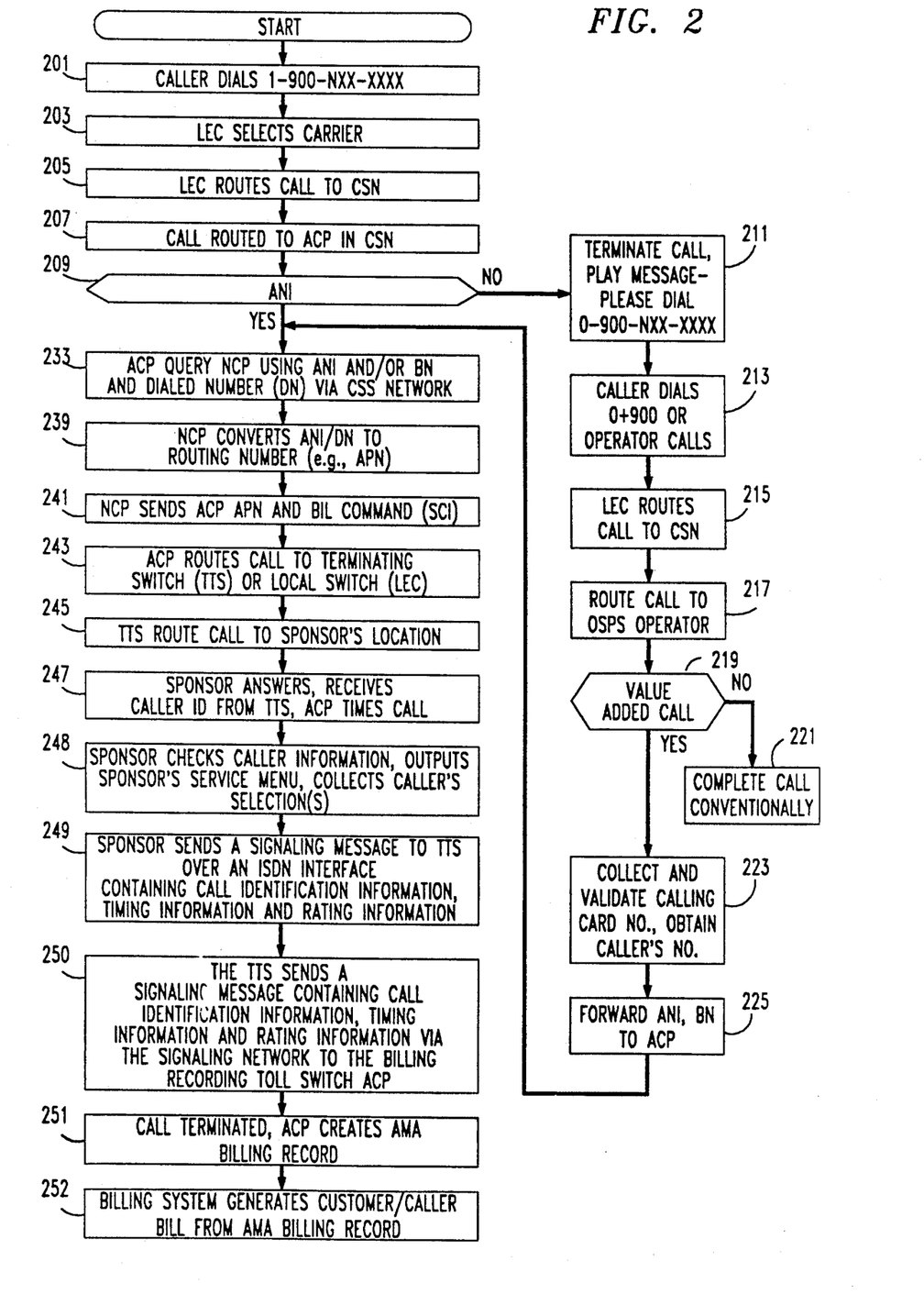
FIG. 2 shows a call flow diagram of the operation of the billing system and the CSN in accordance with the operation of the present invention.

With joint reference to FIGS. 1 and 2 we describe, in more detail, the inventive method and apparatus for the billing of a value-added communication call originated by a caller at station 103 and terminating at sponsor equipment 170. One illustrative value-added communication service which the present invention may be adapted and utilized with is the previously-referenced MultiQuest telecommunication service.

Assume initially, in Step 201, that a caller at station 103 dials 1-900-NXX-XXXX where the N digit is any number between 2-9 and each of the X digits is any number between 0-9. The caller may have selected to call this 900 number based on seeing or hearing the sponsor advertisement in various media.

The LEC 101 receives the dialed number and, in step 203, selects the long distance carrier using the dialed 900 number. In our example, we assume that the dialed 900 number specified AT&T as the Carrier Switch Network (CSN) 100. Note, while the operation of the present invention is described with reference to the AT&T CSN 100, the present invention could be adopted in a straightforward manner to operate with other CSN arrangements. In step 205, LEC 101 routes the call to CSN 100 where it is received by OTS 110. In should be noted that the originating LEC 101 may be either an Equal Access End Office (EAEO) or a Non-Conforming Office (NCO). An EAEO location has Automatic Number Identification (ANI) capability which enables the caller's number to be provided to OTS 110. The ANI number is required for billing the calling party for any calling charges and any value-added service charges.

If the caller's LEC 101 is an NCO location, ANI is not available and, hence, the caller's number must be obtained by CSN 100 directly or by using the assistance of an operator.

The OTS 110 recognizes the dialed number as a value-added service number (e.g., a MultiQuest service call) and routes the call, in step 207, to ACP 130 for further call processing. ACP 130 determines from the incoming trunk group identity that the call is a direct-dialed call and not an operator-assisted call. Note, in an alternate embodiment, both direct-dialed (1-900 calls) and operator-assisted calls (0-900 calls) may be received at the ACP 130, via OTS 110, without OSPS 120 intervention. In such a case, the ACP 130 forwards calls to the OSPS 120. It should be noted that the operation of the present invention is the same for both of these embodiments.

In step 209, ACP 130 determines whether an ANI number is received from OTS 110, if so, call processing continues in step 233; if not, the call is blocked or terminated with an appropriate message in step 211. An illustrative message (from announcement system 145) in step 211 informs the caller that "your call cannot be completed as dialed. Please redial your call as 0-900-NXX-XXXX".

For direct-dialed calls which are blocked (i.e., those without ANI numbers) as well as those calls or which the caller desires operator assistance, the caller dials 0-900-NXX-XXXX (step 213). When CSN 100 is the AT&T network, the caller may also reach OSPS 120 without the intermediate LEC 101 screening.

LEC 101 identifies the call as an AT&T network call and routes the call to CSN 100, in step 215. In step 217, the call is sent by LEC 101 to an OSPS 120 for operator assistance. The OSPS 120 identifies the call as a value-added service call, in step 219, by interpreting the dialed number. If the call is not a value-added call, then it is handled, in step 221, in the appropriate manner by OSPS 120. That is, the call may be appropriately completed or blocked.

If the call is recognized as a value-added call, OSPS 120 may automatically collect the caller's telephone or charge card number or may connect an operator to collect the caller's number. The caller's telephone number (ANI) or charge card number will be used to bill charges incurred by the caller during the call.

Under the automatic card number collection procedure, in step 223, OSPS 120 provides a "bong" tone to the caller, collects the charge card number, (e.g., an AT&T credit card number or commercial credit card number), and requests and receives a credit card validation. In step 225, OSPS 120 forwards the card number to the ACP 130 for call processing. Note, some telephone credit cards use ANI plus a PIN (4-digit personal identification code) as the credit card validation. If the caller enters digits which correspond to the Sponsor-Created Credit Cards (SCC), these numbers are forwarded to the ACP for further call processing. Validation of these card numbers are performed within the network at the NCP. If the caller does not enter the digits, the call is connected to an operator who obtains the caller's number (ANI) and/or charge card number (i.e., billing number), which is forwarded to the ACP 130 for further call processing.

In step 233, ACP 130 sends a query, which includes the 10-digit dialed number (called party) and the ANI and/or billing number, over the CCS network 189 to NCP 180. The CCS network 189 routes the query, based on the dialed number, to the appropriate NCP, NCP 180 in our example.

In step 239, NCP 180 uses the dialed number (DN) (900-NXX-XXXX) to access the NCP data base to identify the sponsor assigned to the dialed number. In step 241, NCP 180 returns the APN routing number (SSS-TTT-XXXX) as well as a BIL command message specifying the parameters for an automatic message accounting (AMA) record (FIG. 4) of this call.

In step 243, the ACP 130 routes the call to the terminating toll switch TTS 160 or local switch LEC 106 indicated by the SSS digits of the routing number. In our example, we assume the call is routed through routing network 150 to TTS 160. In step 245, TTS 160 routes the call to the called (i.e., sponsor's) location (e.g., ESP 170 in FIG. 1). At this point, TTS 160 sends a signaling message including the caller's identification, as part of the well-known ISDN call setup procedure. The signaling message may be in a SETUP message. This information is sent over the D channel of the ISDN connection. A caller's identification is defined herein to mean a network call identification number (which can be translated into the caller's station number), caller's station number, caller's billing number, a subaccount indicator (caller's subaccount number) or other identification which ensures that the proper party will be billed for the call.

In step 247, when answer supervision is returned by the sponsor's ESP 170, the ACP 130 will start timing the call. Note, ESP 170 may also time the call connection for its own purposes.

In response to the receipt of the SETUP message, ESP 170 sends response back to TTS 160 to indicate that the call identification information has been received (e.g., CONNECT message).

In step 248, an attendant or announcement circuit 176 at the sponsor ESP 170 sends a greeting to the user and requests various user information, e.g., name, account number or other identifiers. The sponsor collects the caller response and may do a credit check on a caller using the provided information. If the credit check indicates that the call should not be accepted, then a suitable message is outputted to the caller and the call is terminated.

If the credit check indicates the call should be continued, ESP 170 outputs a menu of various sponsor's services available to the user. If ESP 170 uses an attendant, the attendant would recite the menu and collect the responses. If ESP 170 is automated, the menu selection process may use an interactive voice response format which enables the user to enter selections, using touch-tone entries, at station 103, in response to voice queries from the sponsor ESP 170. The touch-tone receiver 177 would receive the user's selection. Alternatively, the sponsor ESP 170 may include speech recognition equipment 178 which can determine the user selections. Moreover, if the user station 103 includes a video display terminal or computer, a text message can be outputted to the caller. Additionally, if the user station 103 includes a facsimile machine, data in facsimile form can be sent thereto from ESP 170.

After the attendant, touch-tone receiver 177 or speech recognizer 178 collects the caller's response, ESP 170 selects appropriate billing parameters for the call. The sponsor provides the caller with the desired information service requested by connecting the caller to an information consultant or by outputting information directly from a database (in voice, text or fax form). Note, according to another aspect of the invention, the caller may, during the call, request a connection to more than one sponsor-provided feature or service. In such a scenario, the sponsor 170 may bill the caller at a rate which is appropriate for each of the requested services.

During step 249, before the call is terminated, the sponsor 170 sends a signaling message to the terminating toll switch 160 via ISDN interface 179 and facility 190 or 191, respectively. Note, according to another feature, a separate signaling message can be sent each time the caller has selected a different service which requires a different rating or billing information. The rating or billing information for the various services provided is passed from the sponsor's ESP 170 via TTS 160 to the billing system where billing data are being collected, using either a connection-oriented or connectionless architecture. Note, the billing system 140 could be connected to the ACP 130, as shown in FIG. 1, or alternatively to the originating toll switch 110 or the terminating toll switch 160.

If the architecture is connection-oriented, a well-known ISDN network-to-user Temporary Signaling Connection (TSC) will be used. If the architecture is connectionless, one or more of the well-known ISDN REGISTER messages may be used. This signaling message contains call identification, call timing and call rating information, referred to as the sponsor-specified caller rate information, as illustrated in 310 of FIG. 3. In response, TTS/SN 160 returns a response message ESP 170 to indicate a receipt of the information (e.g., FACILITY message).

The call identification information is the information originally provided by the network. Note, it is contemplated that the terminating toll switch TTS 160, and ESP 170 may be arranged to receive additional information, e.g., third party billing, credit card billing, as part of the call identification information. A caller-provided subaccount indicator (see 420 of FIG. 4) may also be provided by ESP 170 to the network.

The call rate information would include the actual charges incurred by the caller, based on the caller-selected services provided by the sponsor ESP 170. The rate information may also be specified using a variety of call length and call rate parameter combinations illustrated in section 420 of AMA billing record of FIG. 4. Thus, for an Initial Period Length (IPL) an Initial Period Rate (IPR) may be charged and an Additional Period Rate (APR) charged for the Additional Period Length (APL). A Free Period Length (FPL) may be provided by the sponsor as well as a Rate Modifier (RM) which provides discounts to be applied to the calling charges. Note, the sponsor may specify a caller charge which does not vary with time by, for example, sending it as an IPR parameter with an APR parameter of zero. Thus, the caller charge would not vary with connection time.

The sponsor may adjust the call rating information to vary with the time of day, day of week, and day of year. The sponsor billing information may identify the type of call being billed (e.g., 421) which may vary in accordance with the selection response (touch tone digits or voice) of services by the caller. Note, if the caller selects more than one sponsor-provided service, then the billing record of FIG. 4 may require separate fields 420 and 421 to store billing parameters for each service or feature selected by the caller.

The sponsor may also vary charges depending on the caller's geographic area. The sponsor may also permit the caller to directly specify billing charge, for example, where the sponsor is a fund raiser and the user wants to make a donation to a charitable organization. Additionally, the sponsor may also provide a textual descriptor (text describing the charges incurred by the caller) as part of the billing information. Finally, the sponsor may optionally specify various call timing information back to the network. This may include the previously-mentioned IPL, APL, and FPL shown in 420 of FIG. 4.

In step 250, the terminating toll switch 160 sends a signaling message containing the call identification, call timing and call rating information to the billing recording toll switch ACP 130 via routing network 150.

Figure 3:
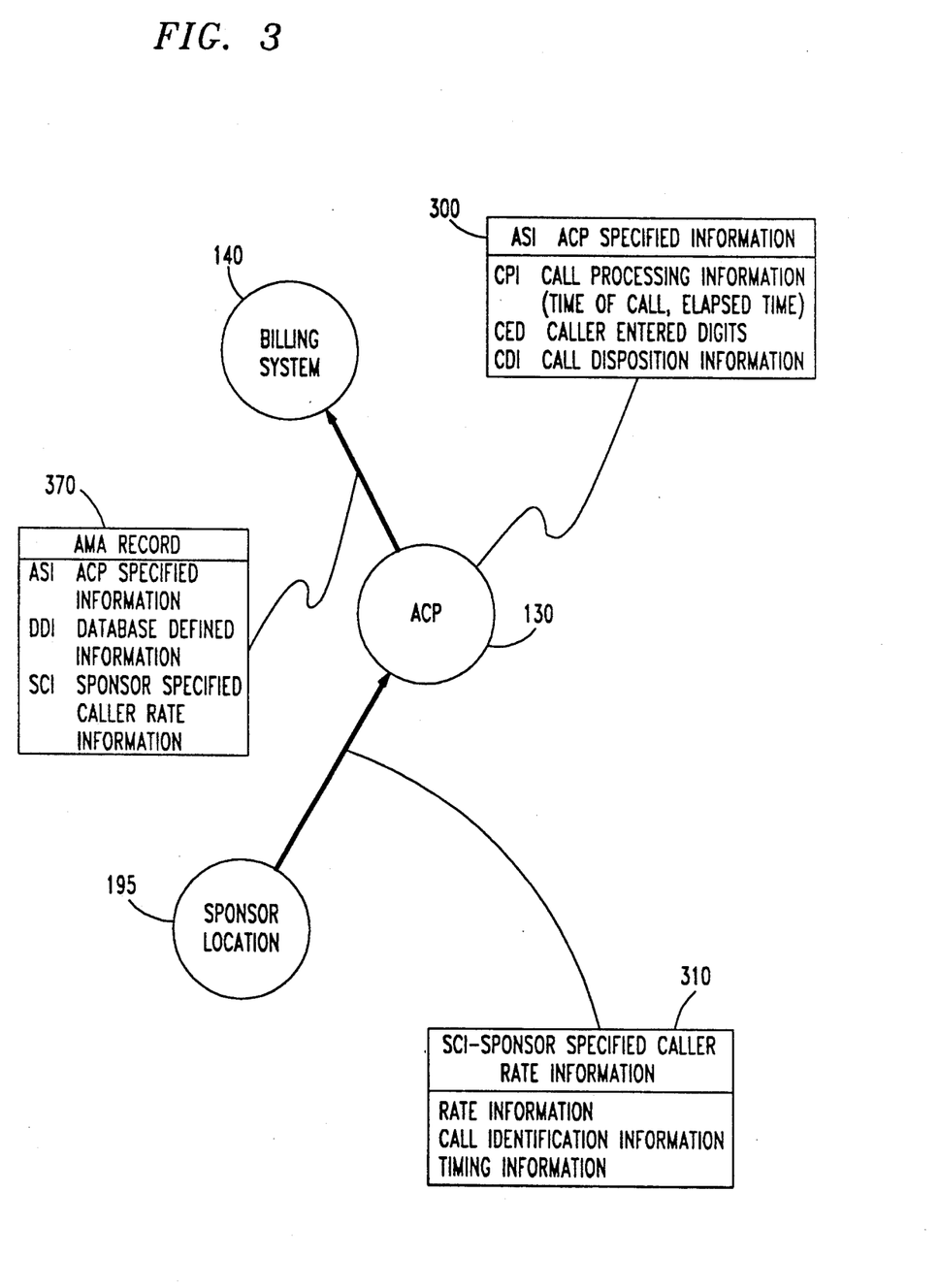
FIG. 3 describes the mechanism by which the sponsor sends the rate information to the billing toll switch (the parameter messages are also shown in the figure)

With reference to FIG. 3, the ACP 130 receives the sponsor-specified caller rate information 310 and adds an additional set of parameters to the message. The information set added by ACP 130 is called ACP Specified Information (ASI) 360. The ASI includes, but is not limited to, the following parameters to the message sent to the billing systems. The ACP 130 defines a set of parameters collectively called Call Processing Information (CPI). This includes parameters such as Time of Call, Elapsed Time, etc. The ACP 130 receives Caller Entered Digits (CED) which are sent to the billing system and to the sponsor. The Call Disposition Information includes the response parameters from ACP 130 to the billing systems, and the sponsor, detailing the disposition of the particular call.

Figure 4:
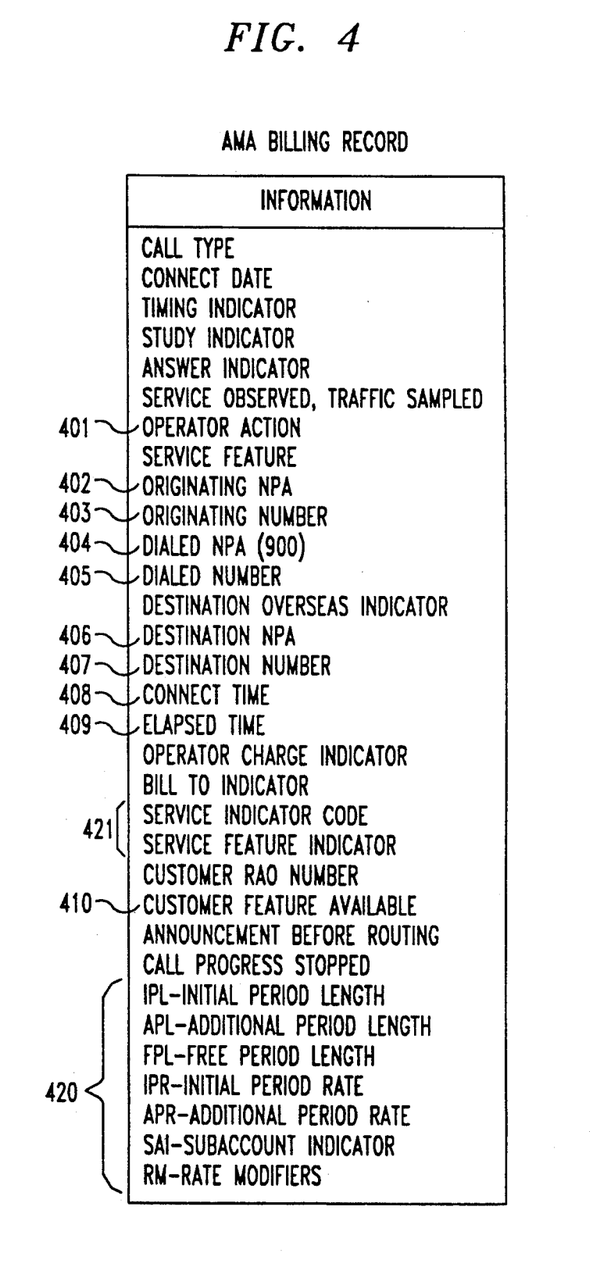
FIG. 4 shows a typical AMA billing record used to bill callers for calls made over the network.

We again return to the call flow description of FIG. 2. In step 251, when the call is terminated the ACP 130 creates an AMA billing record shown in 370 of FIG. 3. FIG. 4 illustrates a typical AMA billing record structure and typical parameters therein which may be utilized for billing for a sponsor-provided value-added service (e.g., MultiQuest service). Some of the various parameters (401-409) of the AMA structure are obtained from the network message of FIG. 3 as well as from the ANI, dialed number and APN information associated with the value-added call. The significant billing parameters in the AMA record are the Billing Number (BN) 404-405, Connect Time (CT) 408, Elapsed Time (ET) 409, and Service Charge Information SCI 420. The Connect Time (CT) and the Elapsed Time (ET) are the values determined by ACP 130 in step 247.

In step 252, Billing System 140 generates the caller's and the sponsor's bills from the AMA billing record received from ACP 130 in a well-known manner. For calls originated through the originating toll switch 110 (1+calls) a caller's bill may appear on the telephone bill to station 103. For calls originating through OSPS 120 (i.e., 0+calls) a caller's bill may appear on a third-party telephone bill, on a carrier credit card, or on a commercial credit card. The caller's bill may also include the textual descriptors provided by the sponsor as part of the billing information.

The billing system 140 processes the AMA records to create aggregate and detailed call volumes and traffic parameters (e.g., geographic, time of day, calls blocked, etc.). The billing system also calculates the aggregate and detailed breakdown of revenues either payable to or receivable from the sponsor. The detailed sponsor billing records also contain subaccount indicators provided by the sponsor on a per call basis. This allows the sponsor to bill their clients or process the billing records in an appropriate manner.

The present invention may also be utilized to enable the sponsor to bill the caller for goods purchased over the telephone from the sponsor in addition to services provided by the sponsor. Furthermore, the invention may be utilized to accept caller-specified charges (e.g., donation made to a charity sponsor) which are entered by the caller, verified by the sponsor, and incorporated in the AMA record.

The sponsor can change the rate in real time. In one example, assume that the sponsor is in the business of providing expert consultation services. When the caller makes a call and pays the sponsor's premium charges, the caller may not wish to hear an answering machine. To better serve their clients, the sponsor might wish to set the rate to zero when the experts are not available (making it, in effect, a toll free call to the caller). When the experts return, the sponsor might reset the charges back to the original value. This improves the quality of the service to both caller and sponsor.

In a second example, assume the sponsor is advertising their service using television media. If the sponsor is not sure what price the products will bear, the sponsor can adjust the rate and determine the demand for the product in real time. This allows the sponsor to offer "limited time sale" of their goods and services.

The sponsor can specify that the rate varies by the caller's geographical location. This allows the sponsor to price their products differently in different regions. In doing so, they can stimulate their products in new regions of the country.

What has been described is merely illustrative of the application of the principles of the present invention. Other arrangements and methods can be implemented by those skilled in the art without departing from the spirit and scope scope

We claim:

1. A method of billing a caller for charges incurred during a call made over a communication network to a called location, comprising the steps of
establishing an ISDN call connection between the network and the called location as part of said call,
transmitting, over said connection to the called location, information sent from the network identifying the caller's identification number, and
receiving, over said connection at the network, billing information sent from the called location specifying charges incurred by the caller during said call.

2. The method of claim 1 wherein said caller identification and billing information is sent over a D-channel of said connection.

3. The method of claim 1 wherein said caller identification and billing information is communicated over said connection using a SETUP message and a REGISTER message thereof.

4. The method of claim 1 further comprising the step of
enabling the caller to specify one or more services to be provided to the caller during said call and wherein
said billing information includes a separate calling charge for each of said one or more services provided to the caller.

5. The method of claim 4 wherein said network received separate billing information for each separate calling charge.

6. The method of claim 1 further comprising the step of
billing the caller for said incurred charges using an AMA billing record created using said billing information.

7. The method of claim 1 wherein said billing information includes information specifying the type of service provided to the caller during said call.

8. The method of claim 1 wherein said method includes the step of creating a separate billing record specifying said billing information for each connection to the called location.

9. The method of claim 8 wherein said billing information includes textual descriptors which are included as part of the billing record.

10. The method of claim 1 wherein said method includes the step of enabling the caller to specify one or more billing parameters during said call to be used to determine said billing information.

11. The method of claim 10 wherein said caller-specified billing parameters include a billing number for billing said charges incurred by the caller.

12. The method of claim 11 wherein said billing number is the station number of the caller.

13. The method of claim 1 wherein said billing information includes a calling charge rate per fixed time period.

14. The method of claim 1 wherein said billing information includes an initial period charge parameter and an additional period charge parameter.

15. The method of claim 1 wherein said billing information includes a free period length during which no calling charge is assessed to the caller for a call to the called location not exceeding such length.

16. The method of claim 1 wherein said billing information includes a fixed charge per call.

17. The method of claim 1 wherein said billing information specifies the calling charges as a function of the caller's geographic area.

18. The method of claim 1 wherein said billing information includes a calling charge which varies with the time of day.

19. The method of claim 1 wherein said billing information includes a calling charge which varies with the day of week.

20. The method of claim 1 wherein said billing information includes a calling charge which varies with the day of year.

21. The method of claim 1 wherein said billing information includes a calling charge which varies in accordance with digits entered by the caller in response to an announcement played thereto.

22. The method of claim 1 wherein the billing information identifies the type of call being billed.

23. The method of claim 1 wherein said billing information includes a rate modifier (RM) parameter which provides a discount to be applied to the calling charge.

24. The method of claim 1 wherein the billing information includes the total charges incurred by the caller during said call.

25. A method of enabling a called location to send billing information to a communication network for charges incurred by a caller during a call made over the communication network to the called location, comprising the steps of
establishing an ISDN call connection between the network and the called location as part of said call connection,
receiving, over said connection at the called location, information sent from the network identifying the caller's identification number, and
transmitting, over said connection to the network, billing information from the called location specifying charges incurred by the caller during said call.

26. The method of claim 25 further comprising the step of
enabling the caller to specify one or more services to be provided to the caller during said call and wherein
said billing information includes a separate calling charge for each of said one or more services provided to the caller.

27. The method of claim 26 wherein the transmitting step includes transmitting separate billing information for each separate calling charge.

28. The method of claim 25 wherein said caller identification and billing information is communicated over a D-channel of said connection using a SETUP message and a REGISTER message thereof.

29. Apparatus for billing a caller for charges incurred during a call made over a communication network to a called location, comprising
means for establishing an ISDN call connection between the network and the called location as part of said call connection,
means for transmitting, over said connection to the called location, information from said network identifying the caller's identification number, and
means for receiving, over said connection at said network, billing information sent from the called location specifying charges incurred by the caller during said call.

30. The apparatus of claim 29 wherein said caller identification and billing information is communicated over a D-channel of said connection using a SETUP message and a REGISTER message thereof.

31. Apparatus, located at a called party location, for sending billing information to a communication network for charges incurred by a caller during a call made over the network to the called location, said apparatus comprising
means for establishing an ISDN call connection between the network and the called location as part of said call,
means for receiving, over said connection at the called location, information sent from the network identifying the caller's identification number, and
means for transmitting, over said connection to the network, billing information from the called location specifying charges incurred by the caller during said call.

32. The apparatus of claim 31 wherein said caller identification and billing information is communicated over a D-channel of said ISDN connection using a SETUP message and a REGISTER message thereof.

33. A method of billing a caller for charges incurred during a call made over a communication network to a sponsor-provided number, the method comprising the steps of enabling a called location to enter at least one call billing parameter directly to a call billing system, establishing an ISDN call connection between the network and a called location as part of said call, transmitting, over said connection to the called location, information sent from the network identifying the caller's identification number, receiving, over said connection at the network, billing information sent from the called location charges incurred by the caller during said call, and creating a separate billing record specifying the calling charge for each call to the sponsor number including a party-specified charge determined using said billing information.

34. A method of billing a caller for charges incurred during a call made over a communication network to a sponsor-provided number, the method comprising the steps of enabling a called location to enter at least one call billing parameter directly to a call billing system, establishing an ISDN call connection between the network and a called location as part of said call connection, receiving, over said connection to the called location, information sent from the network identifying the caller's identification number, and transmitting, over said connection at the network, billing information sent from the called location to a billing system charges incurred by the caller during said call.

35. Apparatus for billing a caller for charges incurred during a call made over a communication network to a sponsor-provided number, comprising means for enabling a called location to enter at least one call billing parameter directly to a call billing system, means for establishing an ISDN call connection between the network and a called location as part of said call, means for transmitting, over said connection to the called location, information sent from the network identifying the caller's identification number, means for receiving, over said connection at the network, billing information sent from the called location charges incurred by the caller during said call, and means for creating a separate billing record specifying the calling charge for each call to the sponsor number including a party-specified charge determined using said billing information.

36. Apparatus for billing a caller for charges incurred during a call made over a communication network to a sponsor-provided number, comprising means for enabling a called location to enter at least one call billing parameter directly to a call billing system, means for establishing an ISDN call connection between the network and a called location as part of said call connection, means for receiving, over said connection to the called location, information sent from the network identifying the caller's identification number, and means for transmitting, over said connection at the network, billing information sent from the called location to a billing system charges incurred by the caller during said call.

* * * * *